Jan. 19, 1965  A. WÖGERBAUER  3,165,815
PROCESS FOR THE MANUFACTURE OF SECTIONS
Filed July 23, 1962  6 Sheets-Sheet 1

INVENTOR.
ALFRED WÖGERBAUER
BY
Brumbaugh, Free, Graves & Donohue
his ATTORNEYS.

Jan. 19, 1965  A. WÖGERBAUER  3,165,815
PROCESS FOR THE MANUFACTURE OF SECTIONS
Filed July 23, 1962  6 Sheets-Sheet 4

Jan. 19, 1965 A. WÖGERBAUER 3,165,815
PROCESS FOR THE MANUFACTURE OF SECTIONS
Filed July 23, 1962 6 Sheets-Sheet 5

INVENTOR.
ALFRED WÖGERBAUER
BY
ATTORNEYS.

Jan. 19, 1965     A. WÖGERBAUER     3,165,815
PROCESS FOR THE MANUFACTURE OF SECTIONS Filed July 23, 1962     6 Sheets-Sheet 6

INVENTOR.
ALFRED WÖGERBAUER
BY
ATTORNEYS.

United States Patent Office 3,165,815
Patented Jan. 19, 1965

3,165,815
PROCESS FOR THE MANUFACTURE OF SECTIONS
Alfred Wögerbauer, Linz, Austria, assignor to Vereinigte Österreichische Eisen- und Stahlwerke Aktiengesellschaft, Linz, Austria, a company of Austria
Filed July 23, 1962, Ser. No. 211,576
Claims priority, application Austria, July 28, 1961, A 5,828/61
10 Claims. (Cl. 29—155)

This invention relates to a process for the manufacture of sections, such as U-sections or angle sections, tubes or the like from metal strip and of constructions assembled therefrom.

Tubes and sections may be manufactured either from hot-rolled or from cold-rolled strip of various materials, e.g. from steel strip. Hot-rolled strip is cheaper and can be readily formed into sections having relatively sharp bending edges. Cold-rolled strip is expensive, and the degree of bending this type of strip is limited by specific minimum radii, depending on the hardening degree. Section manufacturers therefore frequently prefer the hot-rolled (or the fully annealed) strip material. The further user of sections and/or tubes, on the other hand, chiefly attaches importance to a maximum of strength, in which property the sections made from cold-rolled strip are superior.

According to prior art an increase of the strength of tubes or sections can be achieved by one or several redrawing operations on drawing benches. However, this after-treatment is expensive, for it requires a considerable additional expenditure of space, equipment, material and working time.

It has been known, e.g., in the construction of aircraft to reinforce thin-walled section by applying beads in the flat portions.

It is also known to produce corrugated sheet. Corrugating provides a considerable increase of the moment of inertia and resistance, i.e. an increase of the rigidity and stability of the sheet itself. The physical properties, such as yield point and tensile strength, however, remain practically unaltered by the production of corrugated sheet. The individual corrugations of a corrugated sheet are formed from the original flat sheet not simultaneously, but one after the other. The stressless layer retains its original thickness. The finished corrugated sheet thus is considerably narrower than the non-corrugated starting sheet. The depth of the corrugations is chosen to be a multiple of the strip thickness, as a rule at least ten times the strip thickness. For instance, the smallest gauge of corrugated sheet according to DIN 59,231, which has a corrugation height of 15 mm., is 7.5 times higher than thick when having the maximal associated sheet thickness of 2 mm. Corrugated sheet of 88 mm. height and 1 mm. sheet thickness according to the same standard is even 88 times higher than thick.

It is an object of the invention to strain-harden sections and tubes and constructions manufactured therefrom.

Another object of the invention is to eliminate coil-breaks.

It is a further object of the invention to combine sections and tubes which have been strain-hardened according to the invention to form structures such as lattice work girders, by resistance welding.

The present invention is based on the recognition that, in shaping sections, the deformed regions, e.g., the bending edges of a U-section, are strain hardened to a considerable degree, if the radius is sufficiently small. This phenomenon, however, had no effect on the final U-section made in the known manner; for there is such an unfavorable proportion of the total cross section to the strain-hardened cross section that no substantial increase of strength of the whole section could be scored.

The subject matter of the invention is a process for the manufacture of sections, such as U-sections or angle sections, tubes or the like, as well as of constructions assembled therefrom, e.g. lattice work girders, from metal strip, which process comprises strain-hardening the strip prior to shaping it into the section by cold-working, e.g. cold-rolling, over at least a part of its longitudinal and lateral extension. This cold-work strain-hardening is preferably effected by imparting to the strip a ridge-and-groove or undulatory profile. Groove depths smaller than sheet thickness will be sufficient. Strip which is strain-hardened in such manner accordingly may have a thickness which lies in the same range as the starting material.

Profiling is suitably effected by passing the strip through a roll stand where narrow and shallow grooves are rolled into the strip. As these grooves are rolled in not successively, but simultaneously, the apparent strip width is maintained, as contrasted to corrugated sheet; yield point and tensile strength are increased, while the elongation value is decreased.

By a suitable selection of the groove depth at a given distance of the grooves it is possible to obtain specific, i.e. pre-determined strength values. The groove width is preferably selected to lie in a certain proportional range to the strip thickness. It has proved advantageous, e.g., for strip of steel of the quality St 37 having a strip thickness of 2 mm. to select a groove distance of about 5 mm., i.e. a distance from the centre of a wave crest to the centre of a wave trough of about 2.5 mm. Hardening is already effected when strip of the mentioned type is deformed only by some tenth of a millimeter, that is to say, when the strip is brought to a gauge or nominal thickness, i.e. the distance of the alignment of wave crests on the top side from the alignment of those on the bottom side, of 2.2 mm. (10% imaginary thickening). The same degree of hardening can be obtained, on the other hand, by increasing both the groove distance and the groove depth. In this way it is possible to produce sheets of equal nominal thicknesses and like strength properties from sheets having different thicknesses. If, at a constant sheet thickness and nominal thickness, the hardening degree is to be varied, the groove distance has to be altered. A lower hardening degree is obtained with a larger groove distance.

The following table shows the yield point, tensile strength and elongation values which can be attained according to the invention with different sheet thicknesses, groove widths and groove depths.

TABLE

| Sheet thickness, mm. | Groove width, mm. | Groove depth, mm. | Gauge, mm. | Yield point, kg./mm.² | Tensile strength, kg./mm.² | Elongation, percent |
|---|---|---|---|---|---|---|
| 1.9 | 5 | 0 | 1.9 | 25.0 | 36.3 | 34.8 |
| 1.9 | 5 | 0.4 | 2.3 | 45.0 | 45.3 | 10.7 |
| 1.9 | 5 | 0.7 | 2.6 | 50.4 | 50.6 | 3.6 |
| 2.0 | 5 | 0 | 2.0 | 36.5 | 49.3 | 25.7 |
| 2.0 | 5 | 0.3 | 2.3 | 53.6 | 55.9 | 10.3 |
| 2.0 | 5 | 0.9 | 2.9 | 66.3 | 67.8 | 3.2 |
| 1.5 | 4 | 0 | 1.5 | 33.9 | 43.2 | 27.2 |
| 1.5 | 4 | 0.2 | 1.7 | 47.2 | 48.1 | 12.6 |
| 1.5 | 4 | 0.9 | 2.4 | 60.0 | 60.5 | 2.8 |
| 1.5 | 4 | 0 | 1.5 | 30.4 | 41.8 | 26.7 |
| 1.5 | 4 | 0.3 | 1.8 | 46.7 | 47.1 | 11.1 |
| 1.5 | 4 | 0.7 | 2.2 | 59.2 | 50.4 | 4.3 |

Strip which has been strain-hardened by cold-working in the described manner can be shaped into any desired type of section. Of course, it is also possible to carry out the strain-hardening operation between two or several shaping steps.

According to a preferred embodiment of the invention, a strain-hardened strip which has been pretreated by cold-working as described and is provided with a ridge-and-groove profile is shaped into U-sections, trough sections or frame sections in such manner that a concave curve (wave crest) forms the inside and a convex curve (wave trough) of an undulation forms the outside of the bending edges of the sections. In this manner, shaping of the sections is facilitated, and in addition sharper bending edges are obtained. The manufacture and finishing (e.g. re-grinding) of the shaping tools, such as shaping rolls, draw plates and the like, is substantially simpler, cheaper and more precise in this process.

According to a special embodiment of the invention only portions of the original strip are strain-hardened by cold-working, while other portions remain untreated. For instance, the edges of sections which are destined for subsequent welding, e.g., in the manufacture of tubes having a longitudinal weld seam, may be left soft. Likewise, those parts which are to be highly deformed later on, e.g. those portions which will come to lie in the range of the bending edges of complex shape sections, may be expected from the strain-hardening, whereby the initial elongation value is retained for the further shaping.

For architectural or other reasons it is also possible to have alternate strain-hardened and non-hardened zones or alternate zones of wide and narrow groove widths. Between longitudinal grooves transverse or diagonal grooves may be arranged, whereby the adherence in concrete is improved.

The invention also provides to apply various types of grooves, e.g., longitudinal and transverse grooves, partly or entirely on top of each other in successive cold-rolling stands, that is in a plurality of working stages. In this manner a composite ridge-and-groove arrangement is obtained.

Besides, a hitherto unsolved problem is shape rolling technique can be solved with the aid of a further embodiment of the invention. When changing over to a different strip thickness, up to now the shaping tools had to be changed also in those cases when the external dimension of the section to be produced remained the same. With the aid of the process according to the invention thinner strip can be brought to the same nominal thickness as thicker strip so that changing over to a different strip thickness is possible with the same set of shaping rolls, that is to say, without having to change the shaping rolls.

The invention comprises a further embodiment in which strain-hardened sections are joined by resistance welding. In this case, the individual sections may be superposed in such manner that their ridges and grooves are in crossed relation. The crossing points constitute points of increased current concentration in a resistance welding operation. It is thus possible to accomplish a multi-spot welding in pre-determined areas with a relatively little current expenditure.

The invention is explained and described more fully in the accompanying drawing.

Figure 1:
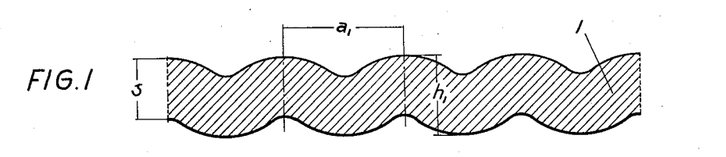
FIGS. 1 to 3 are cross-sectional views of strips having a ridge-and-groove profile running in longitudinal direction.

The steel strip 1 illustrated in FIG. 1 was provided with a ridge-and-groove or undulatory profile produced by cold-rolling, the distance $a_1$ between the grooves being relatively small. The ratio of the groove distance to the sheet thickness is about 2:1. The difference between the nominal thickness or gauge $h_1$ and the real sheet thickness $s$ amounts to the depth of the grooving applied.

Figure 2:
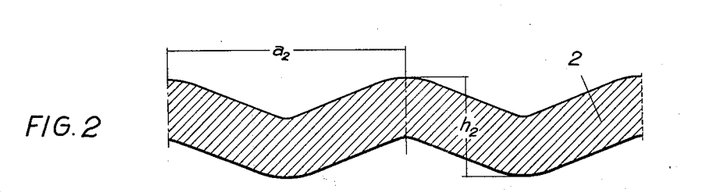

The strip 2 according to FIG. 2, as compared with that according to FIG. 1 received a ridge-and-groove profile with a larger groove distance $a_2$ and a larger gauge $h_2$. The ratio of groove distance to sheet thickness is about 4:1.

Figure 3:
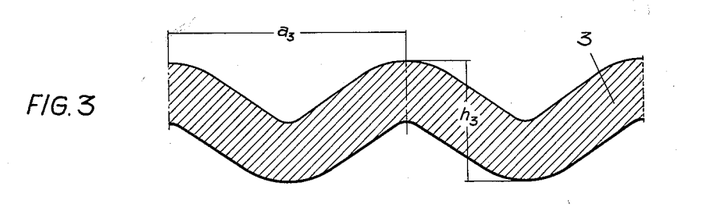

FIG. 3 shows a strip 3 manufactured in the same manner, but having a comparatively large guage $h_3$, the ratio of the groove distance to the sheet thickness again being about 4:1.

Figure 4:
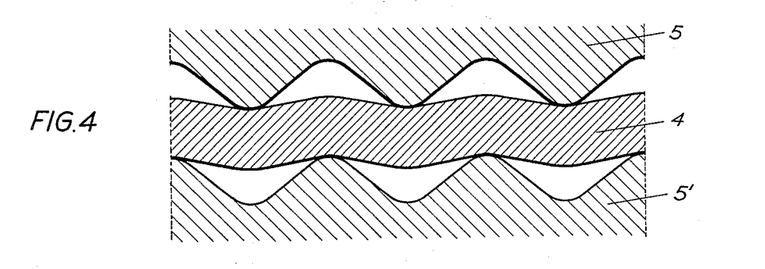
FIG. 4 is a diagrammatic representation of a profiling procedure.

FIG. 4 illustrates diagrammatically the profiling operation according to the invention. It is evident that the strip 4 may be provided with a smaller grooving by a slighter screwing down of the tools, even if the grooving depth of the upper tool 5 and the corresponding lower tool 5′ is relatively large.

Figure 5:
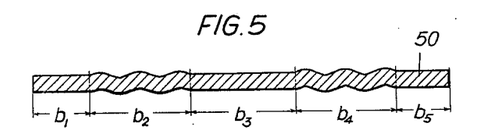
FIG. 5 is a cross-sectional view of a strip which has been cold-worked in accordance with the invention in such manner that strain-hardened zones alternate with non-hardened zones.

FIG. 5 shows a strip 50 which was provided with a ridge-and-groove profile only in predetermined zones. Thus non-worked (non-hardened) zones having widths $b_1$, $b_3$ and $b_5$ alternate with deformed (hardened) zones having the widths $b_2$ and $b_4$.

Figure 6:
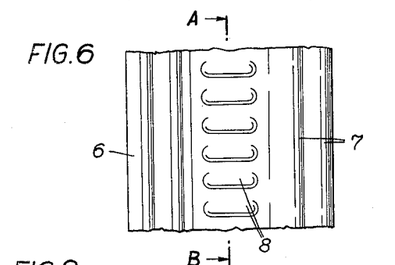
FIG. 6 is a top view of a strip having ridges and grooves running in different directions.
Figure 7:
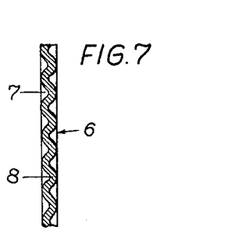
FIG. 7 shows a section along line A—B of FIG. 6.

The top view according to FIG. 6 shows a strip 6 which, according to the invention, was provided with a longitudinal ridge-and-groove profile 7 in its marginal zones and with a transverse ridge-and-groove profile 8 in its central portion; FIG. 7 is the corresponding vertical sectional view.

Figure 8:
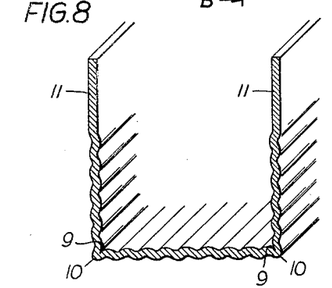
FIG. 8 shows a U-section manufactured according to a special embodiment of the invention.

FIG. 8 illustrates the preferred embodiment according to the invention described hereinbefore, in which a strip having longitudinal grooves is shaped into a U-section. To this end, the strip is bent to the U-section in such manner that the convex curve (wave crest) 10 of an undulation forms the outside and the concave curve (wave trough) 9 of an undulation forms the inside of the bending edges; in other words, the ridges and grooves previously formed by cold-rolling form the edges of the final section. From FIG. 8 it is further evident that the edges 11 have remained untreated and thus non-hardened.

Figure 9:
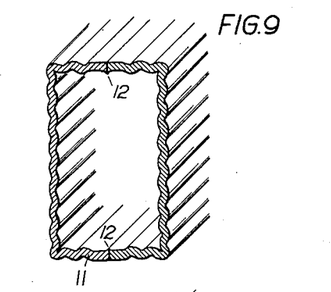
FIG. 9 illustrates the principles of the invention in application to a rectangular tube, and FIG. 10 in application to a door frame section.

In FIG. 9 a rectangular tube is shown which was produced from two sections by welding along longitudinal seams, as shown in FIG. 8. The weld seams 12 of the rectangular tube lie in the untreated, i.e. non-hardened zones 11 of the U-sections, which has technical advantages from the standpoint of welding engineering.

Figure 10:
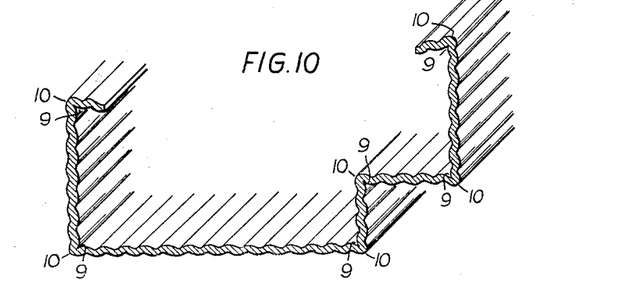

The door frame section shown in FIG. 10 is shaped from undulated strip, the bending edges corresponding to convex and concave curves 9, 10 of the undulations formed by cold-rolling, in the manner as explained in conjunction with FIG. 8. In the manufacture of this type of sections from hot-rolled strips heretofore the difficulty often arose that the large plane areas showed a warping resulting from undulations which were due to the socalled coil-breaks. This condition frequently evoked objections, particularly after varnishing. Frame sections manufactured according to the instant invention do not have the mentioned disadvantage.

Figure 11:
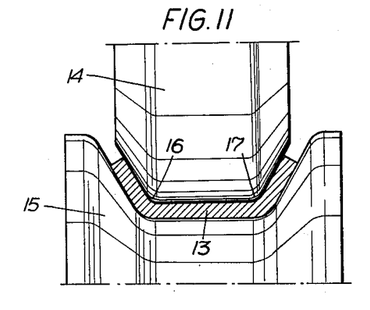
FIG. 11 illustrates the conventional mode of manufacture of a trough section from non-treated strip in the roll gap between a punch roll and a die roll.

In FIGS. 11 to 14 the production of trough sections and U-sections is illustrated diagrammatically. As has been mentioned hereinbefore, FIG. 11 shows the conventional mode of manufacture of a trough section from untreated (not-hardened) strip 13 in the shaping gap between a punch roll 14 and a die roll 15. This known system requires not only a very precise adjustment of the roll gap, but also very exact machining of the bending elements 16, 17. Circular grinding of these elements 16, 17 of the shaping tools involves major difficulties and is very expensive.

Figure 12:
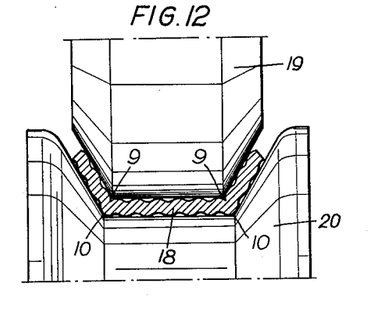
FIG. 12 illustrates the same process step, using strip that has been pretreated in accordance with the invention.

According to FIG. 12 the same procedure is illustrated in application to a strip 18 pre-formed by cold-rolling (hardened by ridge-and-groove profiling), a shaping gap being provided between the punch roll 19 and the die roll 20.

In a similar manner as described in conjunction with FIGS. 8 and 10, the groove distance adjusted at the initial profiling of the strip 18 is such that at the bending edges provided in the shaping gap a convex curve (wave crest) 10 will abut upon the lower tool and a concave curve (wave trough) 9 will abut upon the upper tool. As distinct from the tools shown in FIG. 11, circular grinding of the punch roll surfaces is not required in the embodiment according to FIG. 12. The tools possess predominantly cylindrical and conical surfaces, which are easily ground and do not cause any difficulties, so that a substantial facilitation is achieved.

Figure 13:
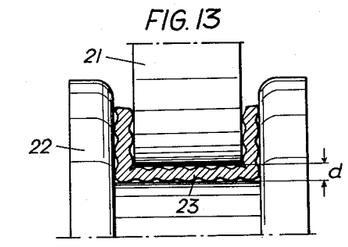
FIGS. 13 and 14 show the manufacture of U-sections having equal nominal thicknesses from undulated strips of different wall thicknesses in the same shaping roll set.
Figure 14:
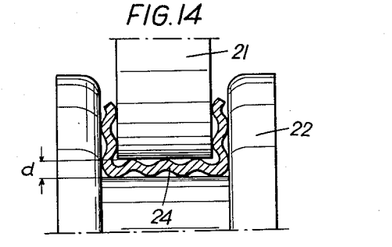

FIGS. 13 and 14 illustrate in a similar manner the manufacture of U-sections, the pre-formed grooves again forming the bending edges so that circular grinding of the punch rolls is not required. From these illustrations it is further evident that in the same set of shaping rolls, i.e. in the illustrated example, between the punch roll 21 and the die roll 22, strips 23 and 24 having different thicknesses can be shaped into U-sections, their gauge $h$ being equal. This is particularly advantageous if sections having equal sizes but different thicknesses are to be produced. For this purpose the groove depth of the thinner sheet is larger, namely so large that the total of groove depth plus sheet thickness remains constant. If strain-hardened sheets of like gauge and different thicknesses are to receive equal strength properties, a larger groove distance has to be chosen for the thinner sheet, corresponding to the greater groove depth. At a change of programme from a certain size of sections to a like section having a different sheet thickness, not the total number of shaping rolls, but only the pair of rolls required for strain-hardening have to be exchanged. The strip required in the subsequent programme need not be newly supplied to the apparatus, as is usually necessary at a change of the programme of section rolling machines, but its starting end can be welded directly to the strip used in the terminating manufacturing programme. Thereby the output of this type of plants can be materially increased.

Figure 15:
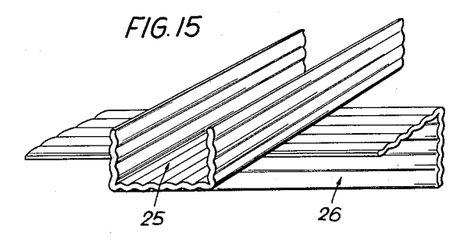
In FIGS. 15 to 17 embodiments of the invention relating to the production of composite constructions are illustrated.

In order to further accelerate the change of programme, several strain-hardening stands may be arranged one behind the other, the pair of rolls corresponding to the particular sheet thickness being processed being used, i.e. screwed down, in each case. The remaining stands are not employed. The ridges formed in the strain-hardening operation according to the instant invention may be used as elongated projections for a multiple projection welding. FIG. 15 illustrates a composite construction assembled from a U-section 25 provided with a ridge-and-groove profile according to the invention and an angular section 26 treated in the same manner. If electric mains (e.g. a flat electrode) of a resistance-welding machine are applied to both sides of the crossing portions, the sheets become spot-welded at the contacting crossing points in one operation.

Figure 16:
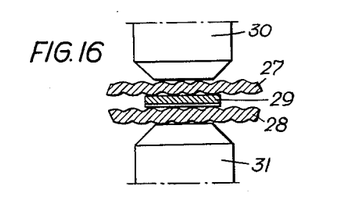
Figure 17:
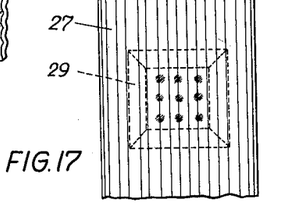

If the undulations of the sections to be joined in the manufacture of a composite construction run parallel, the same effect may be achieved by interposing a member having transverse undulations or by interposing wire elements. This is illustrated diagrammatically in FIGS. 16 and 17. The strips 27 and 28 which have parallel ridges and grooves are welded together with the aid of the interposed member 29, for which purpose they are arranged between two electric mains (electrodes) 30 and 31.

Figure 18:
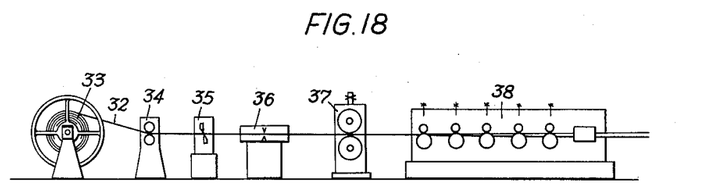
FIG. 18 is a diagrammatic general view of the apparatus for carrying out the process according to the invention, and in FIGS. 19 and 20 details of the apparatus are shown on a larger scale as a lateral view and as a vertical sectional view.

The process may be carried out on the usual section mill trains. Shape rolling plants as well as drawing benches are suitable. Preferably a suitably strong roll stand for the strain-hardening is arranged between the strip-welding device and the shape-rolling machine or drawing bench. FIG. 18 is a diagrammatic representation of an apparatus of the mentioned type. The strip 32 travels from a pay-off reel 33 over a feed roller set 34 and a strip cutter 35 to the welding device 36, by means of which the ending strips are welded together with the starting ends of the strips coming from the reel. In the roll stand 37 the cold-working, e.g. ridge-and-groove profiling of the strip is carried out, whereby a strain-hardening effect is accomplished as described. On the shafts of this stand shaping rolls are mounted which have the roll pass design illustrated in FIG. 4 and possess a sufficient degree of hardness, e.g. 65 RC. Screwing down of the rolls is adjusted to obtain the desired hardening degree. 38 is a shape rolling machine.

The technological procedure in the strain-hardening process according to the invention is the following: When the rolls are approximated to each other and grip the non-treated strip, an alternate transverse upwards and downwards bending is effected first. The external layers (seen in transverse direction) are alternately stretched and compressed and thereby hardened. However, no reduction of the strip width is caused. If the distance between the grooves relative to the sheet thickness is sufficiently large (FIG. 2) a transverse stretching will follow the transverse bending, whereby the compressional stresses exerted on the inside of the grooves are gradually compensated. By further screwing down (approximation) of the strain-hardening rolls, the roll gap is first closed, whereby the transverse bending as well as the transverse stretching are terminated. A further narrowing of the roll gap then effects a stretch rolling with a reduction of the original cross-sectional area of the strip. It is thus possible to obtain any desired ratio of yield point to elongation value by a suitable shaping and adjustment of the tools, that is to say, by optional termination of the strain-hardening process.

The third stage of the process, i.e. the stretch rolling step, can be utilized not only for a further strain-hardening of the original strip, but also for standardizing or sizing the same. It is possible thereby to produce tubes and sections having the same thickness tolerances as cold-rolled strips by using hot-rolled, i.e. cheaper strip.

For the transverse bending and transverse stretching it is of advantage if the roll diameter is large in proportion to the sheet thickness. Thereby any possible tendency for a reduction of the apparent strip width is counteracted. For the stretch rolling, on the other hand, it is advantageous to have the smallest possible roll diameter.

According to an embodiment of the invention this may be achieved by operating the roll stand selectively as a two-high or as a four-high mill. Of course, it is also possible to arrange a four-high mill behind a two-high mill or vice versa. At a sheet thickness of 1.5 to 2.5 mm. the roll diameter of the two-high mill suitably is 150 to 250 mm. and that of the four-high mill 40 to 80 mm.

Figure 19:
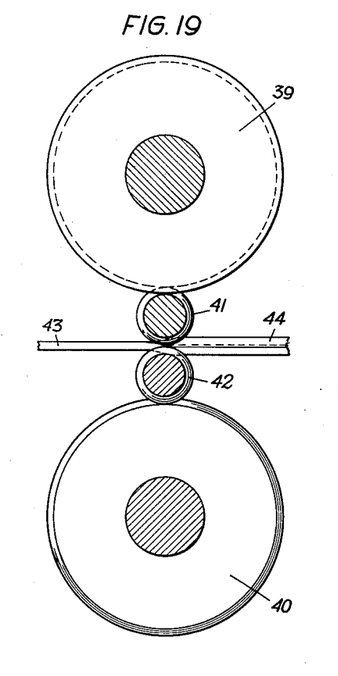
Figure 20:
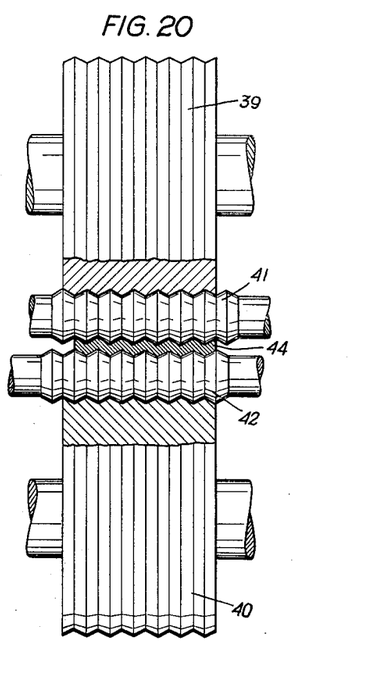

FIGS. 19 and 20 are diagrammatic representations of the mentioned four-high type mill. 39 and 40 designate the upper and the lower supporting rollers, 41 and 42 the upper and the lower stretching rolls (working rolls), 43 the non-hardened and 44 the strain-hardened strips.

Figure 21:
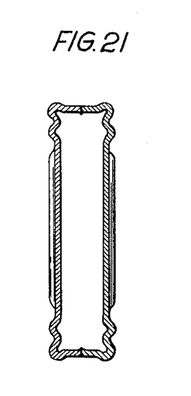
FIG. 21 is a sectional view of a flat tube suitable for use at heat exchanger.
Figures 22, 23:
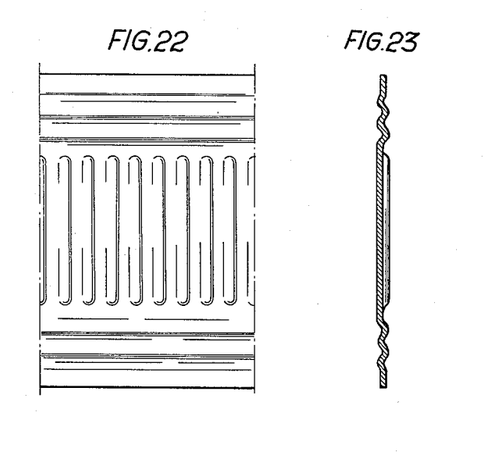
FIG. 22 is a top view and FIG. 23 is a sectional view of one of the two strain-hardened strips from which the flat tube is manufactured.
Figure 24:
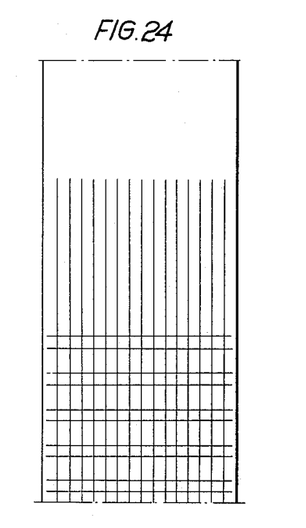
FIGS. 24 and 25 illustrate strips having superimposed strain-hardening profiles, which are preferably applied to the strip in successive roll stands.
Figure 25:
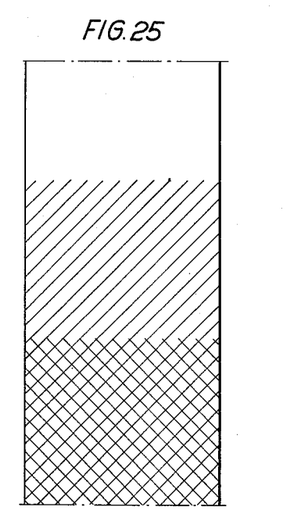

The fact that strain-hardening effects an increase of surface area may be utilized, according to the instant invention, in the manufacture of heat exchangers. As is shown by way of a flat tube in FIGS. 21 to 23, longitudinal grooves are applied with advantage to those portions of the strip which are subsequently deformed. Those portions of the strip which will remain flat, on the other hand, are provided with transverse undulations, to the effect that the flat tube according to the instant invention will withstand much higher compressive stresses than a flat tube manufactured from non-hardened strip.

Figure 26:
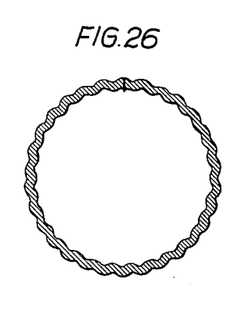
FIG. 26 is a sectional view of a strain-hardened round tube having longitudinal grooves.

FIG. 26 shows a round tube manufactured from strip provided with longitudinal undulations according to the invention and welded together at the edges. The edges may be bonded by induction or resistance welding.

Figure 27:
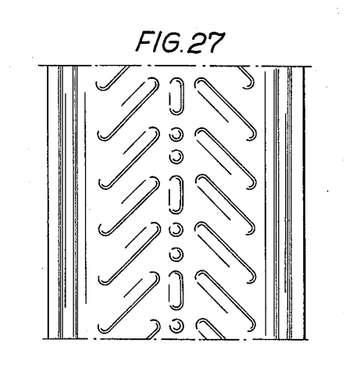
FIG. 27 is a top view of a strain-hardened strip having a composite ridge-and-groove pattern.

FIG. 27 illustrates a strain-hardened strip provided with a longitudinal ridge-and-groove profile at the margins, an adjoining diagonal boss profile and a central relief profile. This type of strip is used for the manufacture of structural members, decorative tubes and other members of architectural effect, with advantage.

Figure 28:
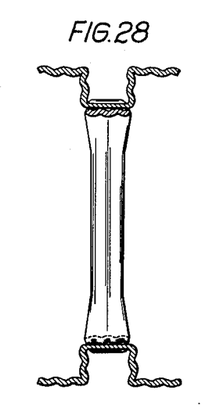
FIGS. 28 and 29 represent a sectional view and a lateral view of a lattice truss manufactured from strain-hardened sections, the connection between the upper boom and the lower boom with the lattice work being preferably effected by resistance welding.
Figure 29:
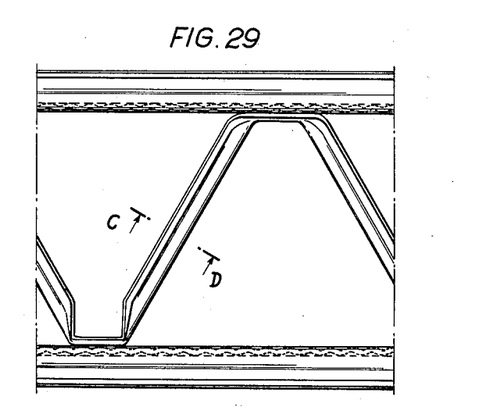
Figure 30:
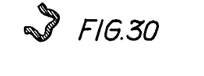
FIG. 30 is a sectional view of a frame member of this lattice work girder, along the line C—D of FIG. 29.

FIGS. 28, 29 and 30 illustrate the manufacture of a lattice work girder. Two open-box sections provided with longitudinal and transverse undulations, which form the upper and lower booms of the truss are connected with a zigzag lattice work by multi-spot welding. The lattice work consists of U-sections provided with a ridge-and-groove profile; however, any other cross section may likewise be used.

Summing up, it can be said that the instant invention offers the following advantages: considerable adjustable increase of strength, particularly of the yield point; increased resistance against warping of flat section portions; facilitation of the shaping and reduction of expenses for the production of shaping rolls; possibility of manufacturing sections of equal size without re-adjustment of the shaping rolls or drawing tools from sheets having different thicknesses; increased surface area resulting in improved heat exchange properties or improved adherence in concrete; particular suitability for bonding by resistance welding.

What I claim is:

1. A process for the manufacture of sections from metal strip, comprising cold-rolling the strip through the gap between grooved rolls to impart to at least parts of said strip a ridge-and-groove profile without altering the width of the strip, said strip being strain-hardened thereby, continuously shaping said ridge-and-groove profiled strip into sections having at least one bending edge in the longitudinal direction, the inside of said bending edge being formed by a groove (wave trough) of said strip and the outside of said bending edge being formed by a ridge (wave crest) of said strip.

2. A process as set forth in claim 1 wherein said ridge-and-groove profiled strip is continuously shaped into an open angular section.

3. A process as set forth in claim 1 wherein the shaping is effected by passing said ridge-and-groove profiled strip through the shaping gap between a punch roll and a die roll having sharp working edges, the working edges of said punch roll meshing with grooves of said strip so as to bend said strip along said grooves.

4. A process as set forth in claim 1, wherein a plurality of strain-hardened strips having different sheet thicknesses but equal nominal thicknesses are shaped into sections of like size by means of the same shaping tools, the shaping gap formed between the tools being adjusted to a predetermined nominal thickness.

5. A process for the manufacture of sections having equal strength properties from a plurality of metal strips of various sheet thicknesses, comprising the steps of imparting longitudinal ridge-and-groove profiles to flat strips by cold-rolling to strain-harden the strips, the thinner strips being provided with a profile having a larger groove width and groove depth than the profile imparted to the thicker strip, all of the strips having the same nominal thickness, and shaping the strain-hardened strips into sections.

6. A process for the manufacture of composite constructions from metal strips, comprising the steps of imparting a longitudinal ridge-and-groove profile to flat strips by cold-rolling to strain-harden said strips, bending the strain-hardened strips into angular sections, a groove of the profile forming the inside and a ridge of the profile forming the outside of the bending edges of said angular sections, and bonding the flanges of at least two angular sections by multi-spot welding to form a composite structural member.

7. A process as set forth in claim 6, wherein a plurality of angular sections are superposed with their ridge-and-groove profiles running in parallel relation, interposing a conductive member, and welded together by passing electric current through the contacting points.

8. A process as set forth in claim 6, wherein the composite construction is a lattice work girder, the strain-hardened strips forming the upper and lower booms of the lattice work girder being joined with the lattice work by multispot welding.

9. A process for the manufacture of composite structural members from metal strips, comprising cold rolling the strips through the gap between grooved rolls to impart to said strips a ridge-and-groove profile in the major portion of their width, leaving narrow marginal zones unworked, the strips being strain-hardened in the ridge-and-groove profiled zones, continuously shaping said profiled strips into open sections having at least one bending edge, the inside of a bending edge being formed by a groove (wave trough) of said strips and the outside of a bending edge being formed by a ridge (wave crest) of said strips, and subsequently welding together at least two of said open sections along the unworked zones thereof to form composite structural members.

10. A process for the manufacture of composite structural members from metal strips, comprising cold-rolling the strips through the gap between grooved rolls to impart to at least parts of said strips a ridge-and-groove profile without altering the width of said strips, said strips being strain-hardened thereby, continuously shaping said ridge-and-groove profiled strips into section having at least one bending edge in the longitudinal direction the inside of said bending edge being formed by a groove (wave trough) of said strips and the outside of said bending edge being formed by a ridge (wave crest) of said strips, arranging at least two of said sections in such manner that the wave crests of said ridge-and-groove profile are in contact at least at a number of points, and welding together said sections at the points of contact by electric resistance welding.

References Cited by the Examiner

UNITED STATES PATENTS

| | | | |
|---|---|---|---|
| 381,175 | 4/88 | Schoen | 153—2 |
| 1,762,112 | 6/30 | White | 29—155 |
| 1,884,712 | 10/32 | Jerabek | 219—146 XR |
| 2,085,829 | 7/37 | Rogers | 29—551 |

(Other references on following page)

UNITED STATES PATENTS

| | | | |
|---|---|---|---|
| 2,098,752 | 11/37 | Miller | 29—463 |
| 2,181,269 | 11/39 | Gehret | 29—463 |
| 2,329,789 | 9/43 | Schank et al. | 153—68 |
| 2,437,212 | 3/48 | Schottland | 29—501 |
| 2,443,170 | 6/48 | Smith | 29—180 |
| 2,479,047 | 8/49 | Long | 29—501 |
| 2,649,888 | 8/53 | Fay | 153—68 |
| 2,844,864 | 7/58 | Schilberg | 29—155 |
| 2,979,806 | 4/61 | Macomber | 29—155 |
| 3,034,608 | 5/62 | Dengler | 29—155 |

FOREIGN PATENTS 774,236  5/57  Great Britain.

WHITMORE A. WILTZ, *Primary Examiner.*

THOMAS H. EAGER, *Examiner.*